A. W. UPTON.
GARDEN TOOL.
APPLICATION FILED SEPT. 2, 1914.
1,158,335.
Patented Oct. 26, 1915.
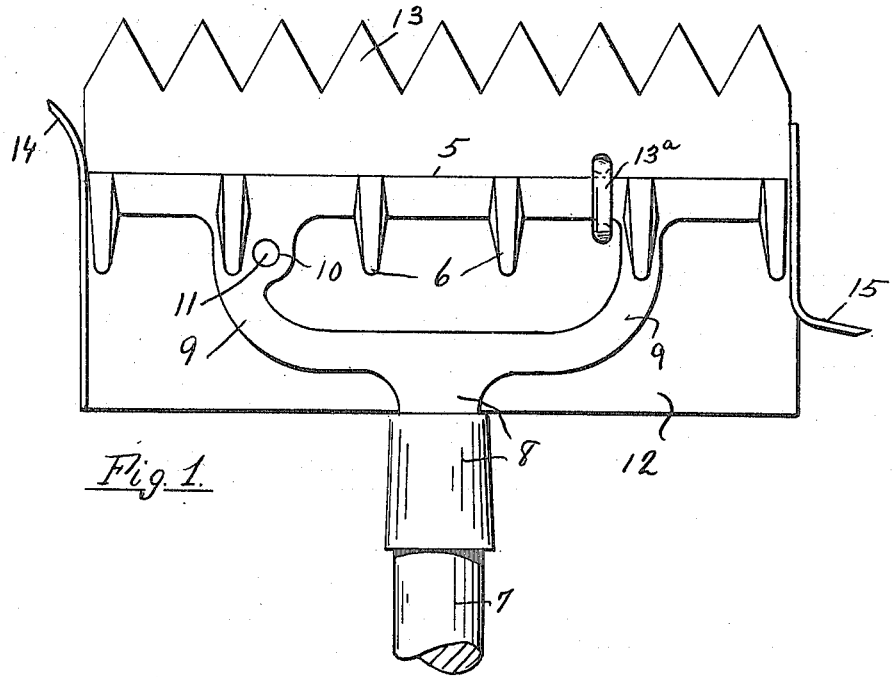
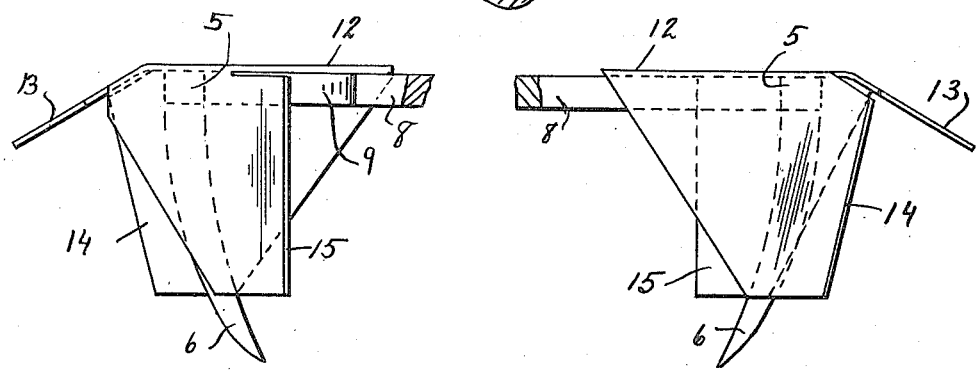
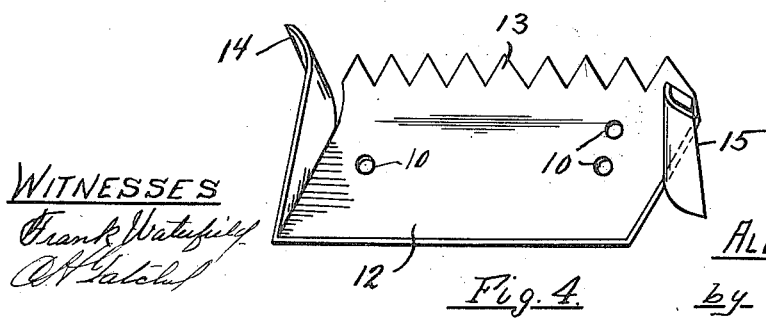
WITNESSES
Frank Wateyield
INVENTOR
ALBERT W. UPTON.
by
ATTORNEY

UNITED STATES PATENT OFFICE.

ALBERT W. UPTON, OF LOS ANGELES, CALIFORNIA.

GARDEN-TOOL.

1,158,335.  Specification of Letters Patent.  Patented Oct. 26, 1915.

Application filed September 2, 1914. Serial No. 859,772.

*To all whom it may concern:*

Be it known that I, ALBERT W. UPTON, a citizen of the United States, residing at the city of Los Angeles, in the county of Los Angeles and State of California, have invented new and useful Improvements in Garden-Tools, of which the following is a specification.

My invention relates to a tool designed for use in hoeing, raking and otherwise destroying weeds in the garden, orchard or field, and the object thereof is to provide a simple and efficient tool for those uses.

In the drawings forming a part of this application: Figure 1 is a bottom plan view of my improved tool with the handle partly broken off. Figs. 2 and 3 are side elevations of the ends of the tool. Fig. 4 is a bottom perspective view of the top plate of my tool.

My improved tool consists of a rake having a head 5 from which project to the front teeth 6 which are of suitable size and shape to be used for cultivating or raking the ground. A wooden handle 7 is secured to the head by means of ferrule 8 and braces 9 which may be formed integral. Adjacent the head the braces may be provided with transverse holes 10, one of which is shown at the left in Fig. 1, for the reception of rivets or bolts 11, by means of which the top plate 12 is secured in place. Two holes, as shown at the right in Fig. 4, may be used at each side of the top plate for the reception of the ends of a yoke 13ª which is passed around the head of the rake and riveted in the plate or otherwise fastened. The parts of my tool thus far described may be of the ordinary construction of an iron rake. The top plate is formed of suitable sheet steel and is secured upon the back of the head as before described or in any other suitable manner. The edge 13 of the top plate which projects beyond the head and away from the handle is serrated and the teeth are sharpened so as to readily cut weeds when pushed against them and forms a push weeder. This push weeder portion of the top plate is bent angularly to a plane passing longitudinally through the head and handle so that it will lie flat upon the ground when the handle is properly positioned for use by a medium sized operator. The ends of the top plate are bent at right angles to the other portions and when positioned for use project in the same direction as the teeth of the rake. One edge of each of the end pieces is sharpened and bent outwardly, that is, away from the rake. At one end the outwardly projecting edge is on the handle side of the head and at the other end the projecting edge is on the other side of the head. These ends form hoe blades one of which is a push hoe 14 and the other a chop hoe 15.

By this construction a garden tool is formed that can be used as a rake, or as a cultivator or as a push weeder or as a hoe.

Having described my invention what I claim is:

1. The combination of a rake with a top plate secured to the head of the rake, said top plate having its ends bent in the direction of the rake teeth and formed into hoe blades.

2. The combination of a rake, with a top plate secured to the head of the rake, said top plate having a toothed edge projecting away from the handle and its ends bent in the direction of the rake teeth and formed into hoe blades.

In witness that I claim the foregoing I have hereunto subscribed my name this 21st day of August, 1914.

ALBERT W. UPTON.

Witnesses:
 G. E. HARPHAM,
 FRANK WATERFIELD.

Copies of this patent may be obtained for five cents each, by addressing the "Commissioner of Patents, Washington, D. C."